(12) United States Patent
Harrison et al.

(10) Patent No.: US 10,642,407 B2
(45) Date of Patent: May 5, 2020

(54) METHOD AND APPARATUS FOR CLASSIFYING TOUCH EVENTS ON A TOUCH SENSITIVE SURFACE

(71) Applicant: Carnegie Mellon University, Pittsburgh, PA (US)

(72) Inventors: Christopher Harrison, Pittsburgh, PA (US); Julia Schwarz, Pittsburgh, PA (US); Scott E. Hudson, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/836,798

(22) Filed: Dec. 8, 2017

(65) Prior Publication Data

US 2018/0107333 A1 Apr. 19, 2018

Related U.S. Application Data

(63) Continuation of application No. 15/206,554, filed on Jul. 11, 2016, now Pat. No. 9,851,841, which is a
(Continued)

(51) Int. Cl.
*G06F 3/041* (2006.01)
*G06F 3/043* (2006.01)
*G06F 3/044* (2006.01)

(52) U.S. Cl.
CPC ............ *G06F 3/0416* (2013.01); *G06F 3/043* (2013.01); *G06F 3/044* (2013.01); *G06F 3/0433* (2013.01);
(Continued)

(58) Field of Classification Search
CPC ........ G06F 3/0416; G06F 3/043; G06F 3/044; G06F 3/0433; G06F 2200/1636; G06F 2203/04106
(Continued)

(56) References Cited

U.S. PATENT DOCUMENTS 2,008,028 A 7/1935 McCortney et al.
2,430,005 A 11/1947 Denneen et al.
(Continued)

FOREIGN PATENT DOCUMENTS

CN 1797305 A 7/2006
CN 1928781 A 3/2007
(Continued)

OTHER PUBLICATIONS

Sarah, M. K. et aL, "A Personal Touch—Recognizing Users Based on Touch Screen Behavior," PhoneSense'12, Nov. 6, 2012, Toronto, ON, Canada, Nov. 6, 2012, pp. 5.
(Continued)

*Primary Examiner* — Chineyere D Wills-Burns
(74) *Attorney, Agent, or Firm* — Fenwick & West LLP

(57) ABSTRACT

An apparatus classifies touch events. The apparatus includes a touch sensitive surface configured to generate a touch event when an object touches the touch sensitive surface. The touch event entails a mechanical vibration upon contact with the surface. The apparatus includes a touch event detector configured to detect the onset of a touch, and a touch event classifier configured to classify the touch event to identify the object used for the touch event. The mechanical vibration is created via any one of finger parts including a tip, a pad, a fingernail, and a knuckle, each of which has a unique feature different from each other.

6 Claims, 6 Drawing Sheets

Related U.S. Application Data continuation of application No. 14/242,127, filed on Apr. 1, 2014, now Pat. No. 9,465,494, which is a continuation of application No. PCT/US2012/060865, filed on Oct. 18, 2012.

(60) Provisional application No. 61/627,831, filed on Oct. 18, 2011.

(52) U.S. Cl.
CPC ............... *G06F 2200/1636* (2013.01); *G06F 2203/04106* (2013.01)

(58) Field of Classification Search
USPC ........................................................ 345/174
See application file for complete search history.

(56) References Cited

U.S. PATENT DOCUMENTS

| | | | |
|---|---|---|---|
| 3,354,531 | A | 11/1967 | Pryor |
| 4,561,105 | A | 12/1985 | Crane et al. |
| 4,597,932 | A | 7/1986 | Kurihara et al. |
| 4,686,332 | A | 8/1987 | Greanias et al. |
| 5,483,261 | A | 1/1996 | Yasutake |
| 5,544,265 | A | 8/1996 | Bozinovic |
| 5,596,656 | A | 1/1997 | Goldberg |
| 5,615,285 | A | 3/1997 | Beemink |
| 5,625,818 | A | 4/1997 | Zarmer et al. |
| 5,666,438 | A | 9/1997 | Beernink et al. |
| 5,867,163 | A | 2/1999 | Kurtenbach |
| 5,933,514 | A | 8/1999 | Ostrem et al. |
| 6,028,593 | A | 2/2000 | Rosenberg et al. |
| 6,118,435 | A | 9/2000 | Fujita et al. |
| 6,208,330 | B1 | 3/2001 | Hasegawa et al. |
| 6,212,295 | B1 | 4/2001 | Ostrem et al. |
| 6,222,465 | B1 | 4/2001 | Kumar et al. |
| 6,246,395 | B1 | 6/2001 | Goyins et al. |
| 6,252,563 | B1 | 6/2001 | Tada et al. |
| 6,323,846 | B1 | 11/2001 | Westerman et al. |
| 6,337,698 | B1 | 1/2002 | Kelly, Jr. et al. |
| 6,492,979 | B1 | 12/2002 | Kent et al. |
| 6,504,530 | B1 | 1/2003 | Wilson et al. |
| 6,643,663 | B1 | 11/2003 | Dabney et al. |
| 6,707,451 | B1 | 3/2004 | Nagaoka |
| 6,748,425 | B1 | 6/2004 | Duffy et al. |
| 6,772,396 | B1 | 8/2004 | Cronin et al. |
| 6,933,930 | B2 | 8/2005 | Devige et al. |
| 6,943,665 | B2 | 9/2005 | Chornenky |
| 7,050,955 | B1 | 5/2006 | Carmel et al. |
| 7,084,884 | B1 | 8/2006 | Nelson et al. |
| 7,098,896 | B2 | 8/2006 | Kushler et al. |
| 7,212,197 | B1 | 5/2007 | Schkolne et al. |
| 7,443,396 | B2 | 10/2008 | Ilic |
| 7,581,194 | B2 | 8/2009 | Iwema et al. |
| 7,982,724 | B2 | 7/2011 | Hill |
| 8,086,971 | B2 | 12/2011 | Radivojevic et al. |
| 8,144,126 | B2 | 3/2012 | Wright |
| 8,154,524 | B2 | 4/2012 | Wilson et al. |
| 8,154,529 | B2 | 4/2012 | Sleeman et al. |
| 8,170,346 | B2 | 5/2012 | Ludwig |
| 8,199,126 | B1 | 6/2012 | Taubman |
| 8,253,744 | B2 | 8/2012 | Macura et al. |
| 8,269,744 | B2 | 9/2012 | Agari et al. |
| 8,327,029 | B1 | 12/2012 | Purser |
| 8,441,790 | B2 | 5/2013 | Pance et al. |
| 8,547,357 | B2 | 10/2013 | Aoyagi |
| 8,624,878 | B2 | 1/2014 | Sarwar et al. |
| 8,670,632 | B2 | 3/2014 | Wilson |
| 8,674,943 | B2 | 3/2014 | Westerman et al. |
| 8,743,091 | B2 | 6/2014 | Bernstein |
| 8,760,395 | B2 | 6/2014 | Kim et al. |
| 8,762,332 | B2 | 6/2014 | Keebler et al. |
| 8,769,524 | B2 | 7/2014 | Bhullar et al. |
| 9,013,452 | B2 | 4/2015 | Harrison et al. |
| 9,019,244 | B2 | 4/2015 | Harrison |
| 9,030,498 | B2 | 5/2015 | Galor et al. |
| 9,052,772 | B2 | 6/2015 | West |
| 9,060,007 | B2 | 6/2015 | Keebler et al. |
| 9,182,882 | B2 | 11/2015 | Fowler et al. |
| 9,329,688 | B2 | 5/2016 | Harrison |
| 9,329,715 | B2 | 5/2016 | Schwarz et al. |
| 9,377,863 | B2 | 6/2016 | Bychkov et al. |
| 9,557,852 | B2 | 1/2017 | Tsai et al. |
| 9,612,689 | B2 | 4/2017 | Harrison et al. |
| 9,696,859 | B1 | 7/2017 | Heller et al. |
| 9,864,453 | B2 | 1/2018 | Munemoto et al. |
| 10,082,935 | B2 | 9/2018 | Harrison et al. |
| 2002/0009227 | A1 | 1/2002 | Goldberg et al. |
| 2002/0057837 | A1 | 5/2002 | Wilkinson et al. |
| 2002/0070927 | A1 | 6/2002 | Fujitsuka et al. |
| 2002/0126161 | A1 | 9/2002 | Kuzunuki et al. |
| 2003/0048260 | A1 | 3/2003 | Matusis |
| 2003/0110085 | A1 | 6/2003 | Murren et al. |
| 2003/0132922 | A1 | 7/2003 | Phillip |
| 2003/0217873 | A1 | 11/2003 | Paradiso et al. |
| 2004/0012573 | A1 | 1/2004 | Morrison et al. |
| 2004/0021681 | A1 | 2/2004 | Liao |
| 2004/0054711 | A1 | 3/2004 | Multer |
| 2004/0141010 | A1 | 7/2004 | Fitzmaurice et al. |
| 2004/0160421 | A1 | 8/2004 | Sullivan |
| 2004/0199867 | A1 | 10/2004 | Brandenborg |
| 2004/0225730 | A1 | 11/2004 | Brown et al. |
| 2005/0083313 | A1 | 4/2005 | Hardie-Bick |
| 2005/0131778 | A1 | 6/2005 | Bennett et al. |
| 2005/0146512 | A1 | 7/2005 | Hill et al. |
| 2005/0289461 | A1 | 12/2005 | Amado et al. |
| 2006/0010400 | A1 | 1/2006 | Dehlin et al. |
| 2006/0026535 | A1 | 2/2006 | Hotelling et al. |
| 2006/0031746 | A1 | 2/2006 | Toepfer et al. |
| 2006/0152499 | A1 | 7/2006 | Roberts |
| 2006/0173985 | A1 | 8/2006 | Moore |
| 2006/0184617 | A1 | 8/2006 | Nicholas et al. |
| 2006/0217126 | A1 | 9/2006 | Sohm et al. |
| 2006/0230021 | A1 | 10/2006 | Diab et al. |
| 2006/0288329 | A1 | 12/2006 | Gandhi et al. |
| 2007/0011205 | A1 | 1/2007 | Majjasie et al. |
| 2007/0044010 | A1 | 2/2007 | Sull et al. |
| 2007/0075965 | A1 | 4/2007 | Huppi et al. |
| 2007/0085157 | A1 | 4/2007 | Fadell et al. |
| 2007/0100959 | A1 | 5/2007 | Eichstaedt et al. |
| 2007/0109279 | A1 | 5/2007 | Sigona |
| 2007/0126716 | A1 | 6/2007 | Haverly |
| 2007/0168367 | A1 | 7/2007 | Dickinson et al. |
| 2007/0186157 | A1 | 8/2007 | Walker et al. |
| 2007/0192674 | A1 | 8/2007 | Bodin et al. |
| 2007/0245020 | A1 | 10/2007 | Ott, IV |
| 2007/0257767 | A1 | 11/2007 | Beeson |
| 2007/0291297 | A1 | 12/2007 | Harmon et al. |
| 2008/0005666 | A1 | 1/2008 | Sefton et al. |
| 2008/0036743 | A1 | 2/2008 | Westerman et al. |
| 2008/0042978 | A1 | 2/2008 | Perez-Noguera |
| 2008/0082941 | A1 | 4/2008 | Goldberg et al. |
| 2008/0103906 | A1 | 5/2008 | Singh |
| 2008/0117168 | A1 | 5/2008 | Liu et al. |
| 2008/0126388 | A1 | 5/2008 | Naaman |
| 2008/0141132 | A1 | 6/2008 | Tsai |
| 2008/0155118 | A1 | 6/2008 | Glaser et al. |
| 2008/0158147 | A1 | 7/2008 | Westerman et al. |
| 2008/0158168 | A1 | 7/2008 | Westerman et al. |
| 2008/0158185 | A1 | 7/2008 | Westerman |
| 2008/0168403 | A1 | 7/2008 | Westerman et al. |
| 2008/0180406 | A1 | 7/2008 | Han et al. |
| 2008/0244468 | A1 | 10/2008 | Nishihara et al. |
| 2008/0288347 | A1 | 11/2008 | Sifry |
| 2008/0319932 | A1 | 12/2008 | Yih et al. |
| 2009/0025987 | A1 | 1/2009 | Perksi et al. |
| 2009/0073144 | A1 | 3/2009 | Chen et al. |
| 2009/0095540 | A1 | 4/2009 | Zachut et al. |
| 2009/0150373 | A1 | 6/2009 | Davis et al. |
| 2009/0157206 | A1 | 6/2009 | Weinberg et al. |
| 2009/0174679 | A1 | 7/2009 | Westerman |
| 2009/0178011 | A1 | 7/2009 | Ording et al. |
| 2009/0231275 | A1 | 9/2009 | Odgers |

(56) References Cited

U.S. PATENT DOCUMENTS

| | | |
|---|---|---|
| 2009/0232355 A1 | 9/2009 | Minear et al. |
| 2009/0254869 A1 | 10/2009 | Ludwig et al. |
| 2009/0259628 A1 | 10/2009 | Farrell et al. |
| 2009/0262637 A1 | 10/2009 | Badaye et al. |
| 2009/0315835 A1 | 12/2009 | De Goes et al. |
| 2009/0318192 A1 | 12/2009 | Leblanc et al. |
| 2010/0036967 A1 | 2/2010 | Caine et al. |
| 2010/0060602 A1 | 3/2010 | Agari et al. |
| 2010/0085216 A1 | 4/2010 | Ms |
| 2010/0094633 A1 | 4/2010 | Kawamura et al. |
| 2010/0123666 A1 | 5/2010 | Wickholm et al. |
| 2010/0127997 A1 | 5/2010 | Park et al. |
| 2010/0194703 A1* | 8/2010 | Fedor .................... G06Q 30/02 345/173 |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |
| 2010/0265185 A1* | 10/2010 | Oksanen ............... G06F 3/0488 345/173 |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1* | 1/2011 | Kondo .................. G06F 3/0433 345/173 |
| 2011/0057670 A1 | 3/2011 | Jordan |
| 2011/0057885 A1 | 3/2011 | Lehtovirta |
| 2011/0074544 A1 | 3/2011 | D'Souza |
| 2011/0074701 A1 | 3/2011 | Dickinson et al. |
| 2011/0080349 A1 | 4/2011 | Holbein et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1* | 7/2011 | Momeyer ............. G06F 1/1684 715/863 |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaells et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0038554 A1 | 2/2013 | West |
| 2013/0091123 A1 | 4/2013 | Chen et al. |
| 2013/0100071 A1 | 4/2013 | Wright et al. |
| 2013/0176264 A1 | 7/2013 | Almeh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0197380 A1* | 8/2013 | Oral ..................... A61B 5/0452 600/518 |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071095 A1* | 3/2014 | Godsill ................. G06F 3/0418 345/177 |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1* | 9/2014 | Levesque ................ G06F 3/016 345/173 |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0334280 A1* | 11/2014 | Song ..................... G11B 5/6076 369/53.38 |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |

(56) References Cited

U.S. PATENT DOCUMENTS

| | | | |
|---|---|---|---|
| 2016/0012348 | A1 | 4/2016 | Johnson et al. |
| 2016/0098185 | A1 | 4/2016 | Xiao et al. |
| 2016/0117015 | A1 | 4/2016 | Veneri et al. |
| 2016/0156837 | A1* | 6/2016 | Rodzevski ......... H04N 5/23216 348/333.02 |
| 2016/0171192 | A1 | 6/2016 | Holz et al. |
| 2016/0224145 | A1 | 8/2016 | Harrison et al. |
| 2016/0231865 | A1 | 8/2016 | Harrison et al. |
| 2016/0299615 | A1 | 10/2016 | Schwarz et al. |
| 2017/0024892 | A1 | 1/2017 | Harrison et al. |
| 2017/0060279 | A1 | 3/2017 | Harrison |
| 2017/0153705 | A1 | 6/2017 | Kim et al. |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| EP | D 938 039 A2 | 8/1999 |
| EP | 1 659 481 A2 | 5/2006 |
| EP | 1 762 926 A2 | 3/2007 |
| EP | 2 136 358 A | 12/2009 |
| EP | 2 280 337 A2 | 2/2011 |
| GB | 2 344 894 A | 6/2000 |
| GB | 2468742 A | 9/2010 |
| JP | H09-69137 A | 3/1997 |
| JP | 2004-213312 A | 7/2004 |
| JP | 2005-18611 A | 1/2005 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-006122 A | 6/2011 |
| KR | 10-2012-010035 A | 9/2012 |
| WO | 1994/004992 A1 | 3/1994 |
| WO | 2006/070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012166277 | 12/2012 |
| WO | 2013/059488 A1 | 4/2013 |
| WO | 2013/061998 A1 | 5/2013 |
| WO | 2014/037951 A1 | 3/2014 |
| WO | 2014/182435 A1 | 11/2014 |

OTHER PUBLICATIONS

Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated Jun. 13, 2016 in U.S. Appl. No. 15/073,407, 14 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 20 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
International Search Report and Written Opinion for PCT/US2015/047428; dated Nov. 27, 2015, 6 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.

(56) References Cited

OTHER PUBLICATIONS

Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages.
Chinese Office Action for Chinese Patent Application No. 201280062500.7, dated Apr. 27, 2018, 19 pages.
Chinese Office Action for Chinese Patent Application No. 201280062500.7, dated Oct. 10, 2018, 14 pages.
Office Action dated Mar. 30, 2018 for U.S. Appl. No. 15/886,562, 45 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Final Office Action received for U.S. Appl. No. 14/684,407 dated Jan. 18, 2017, 20 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated on Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 13, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U.S. Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800, filed Sep. 15, 2014, 21 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Non-Final Office Action received dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture of Vibro-Acoustic Data Used to Determine Touch Types."
U.S. Appl. No. 14/191,329, filed Feb. 26, 2014, titled: "Using Capacitive Images for Touch Type Classification."
U.S. Appl. No. 13/887,711, filed May 6, 2013, titled: "Using Finger Touch Types to Interact with Electronic Devices."
European Office Action dated Jun. 18, 2018 for European Patent Application No. 12842495.9, 4 pages.
Korean Office Action dated Jan. 10, 2019 for Korean Patent Application No. 2014-7010323, 11 pages (including English translation).
Non-Final Office Action issued for U.S. Appl. No. 14/242,127 dated Jun. 2, 2015, 33 pages.
Final Office Action issued for U.S. Appl. No. 14/242,127 dated Sep. 18, 2015, 28 pages.
Non-Final Office Action issued for U.S. Appl. No. 14/242,127 dated Dec. 28, 2015, 38 pages.
Final Office Action issued for U.S. Appl. No. 14/242,127 dated Mar. 31, 2016, 34 pages.
Notice of Allowance issued for U.S. Appl. No. 14/242,127, dated Apr. 13, 2016, 18 pages.
Notice of Allowance issued for U.S. Appl. No. 14/242,127, dated Sep. 2, 2016, 16 pages.
Asano, Futoshi, Goto, Masataka, Itou, Katunobu, Asoh, Hideki; Real-Time Sound Source Localization and Separation System and

(56) References Cited

OTHER PUBLICATIONS

Its Application to Automatic Speech Recognition; Proceedings of Eurospeech, 2001; p. 1013-1016; 2001.
Benko, Hrvoje, Wilson, Andrew, Balakrishnan, Ravin; Sphere: Multi-Touch Interactions on a Spherical Display; Proceedings of UIST, 2008; pp. 77-86; 2008.
Burges, Christopher; A Tutorial on Support Vector Machines for Pattern Recognition; Data Mining and Knowledge Discovery, 2; pp. 121-167; 1998.
Cao, Xiang, Wilson, Andrew, Balakrishnan, Ravin, Hinckley, Ken, Hudson, Scott; Shape Touch: Leveraging Contact Shape on Interactive Surfaces; IEEE International Workshop on Horizontal Interactive Human Computer System (Tabletop); pp. 139-146; 2008.
Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.
Dietz, Paul, Harsham, Brei, Forlines, Clifton, Leigh, Darren, Yerazunis, William, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.
Dietz, Paul, Leigh, Darren; DiamondTouch: A Multi-User Touch Technology; ACM Symposium on User Interface Software & Technology (UIST); pp. 219-226; 2001.
Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.
Hall. Mark. Frank, Eibe, Holmes, Geoffrey, Pfahringer, Bernhard, Reutemann, Peter, Widen, Ian; The WEKA Data Mining Software: An Update; SIGKDD Explorations, 11(1); pp. 10-18; 2009.
Harrison, Chris, Tan, Desney, Morris, Dan; Skinput: Appropriating the Body as an Input Surface; Proceedings of CHI, 2010; pp. 453-462; 2010.
Harrison, Chris, Hudson, Scott; Scratch Input: Creating Large, Inexpensive, Unpowered and Mobile Finger Input Surfaces; Proceedings of UIST, 2008; pp. 205-208; 2008.
Hartmann, Bjorn, Ringel Morris, Meredith, Benko, Hrvoje, Wilson, Andrew; Augmenting Interactive Tables with Mice & Keyboards; Proceedings of UIST, 2009; pp. 149-152; 2009.
Hinckley, Ken, Song, Hyunyoung; Sensor Synaesthesia: Touch in Motion, and Motion in Touch; Proceedings of CHI, 2011; pp. 801-810; 2011.
Hinckley, Ken, Yatani, Koji, Pahud, Michel, Coddington, Nicole, Roden House, Jenny, Wilson, Andy, Benko, Hrvoje, Buxton, Bill; Pen+ Touch= New Tools; Proceedings of UIST, 2010; pp. 27-36; 2010.
Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen+ Touch Direct Input; Proceedings of CHI, 2010; pp. 2793-2802; 2010.
Holz, Christian, Baudisch, Patrick; The Generalized Perceived Input Point Model and How to Double Touch Accuracy by Extracting Fingerprints; Proceedings of CHI, 2010; pp. 581-590; 2010.
Kaltenbrunner, Martin, Bencina, Ross; reacTIVision: A Computer-Vision Framework for Table-Based Tangible Interaction; Proceedings of TEI, 2007; pp. 69-74; 2007.
Matsushita, Nobuyuki, Rekimoto, Jun; HoloWall: Designing a Finger, Hand, Body, and Object Sensitive Wall; Proceedings of UIST, 1997; pp. 209-210; 1997.
Mimio; http://www.mimio.com.
Olwal. Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, Leo, Che King; Tracking and Characterizing Knocks Atop Large Interactive Displays; Sensor Review, 25(2); pp. 134-143; 2005.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.

Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120;2002.
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906;2008.
Wang, Feng, Ren, Xiangshi; Empirical Evaluation for Finger Input Properties in Multi-Touch Interaction; Proceedings of CHI, 2009; pp. 1063-1072; 2009.
International Search Report and Written Opinion for PCT/US2012/060865; dated Mar. 29, 2013, 10 pages.
Non-Final Office Action issued for U.S. Appl. No. 15/206,554 dated Sep. 21, 2016, 23 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages.
Japanese Office Action for Japanese Patent Application No. 2014-537253 dated May 9, 2017, 5 pages.
Seo et al . . . , "Audio Fingerprinting Based on Normalized Spectral Subband Centroids," Proc. ICASSP, {U.S.A.}, 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages.
Non-Final Office Action received for U.S. Appl. No. 14/684,407 dated Jul. 8, 2016, 11 pages.
U.S. Appl. No. 14/492,604, filed Sep. 22, 2014, titled: "Method and Apparatus for Improving Accuracy of Touch Screen Event Analysis by Use of Edge Classification.", 35 pages.
U.S. Appl. No. 14/495,041, filed Sep. 24, 2014, titled: "Method for Improving Accuracy of Touch Screen Event Analysis by Use of Spatiotemporal Touch Patterns.", 34 pages.
U.S. Appl. No. 14/483,150, filed Sep. 11, 2014, titled: "Method and Apparatus for Differentiating Touch Screen Users Based on Touch Event Analysis.", 38 pages.
U.S. Appl. No. 14/242,127, filed Apr. 1, 2014, titled: Method and Apparatus for Classifying Dtouch Events on a Touch Sensitive Surface, 36 pages.
U.S. Appl. No. 13/849,698, filed Mar. 23, 2013, titled: "Method and System for Activating Different Interactive Functions Using Different Types of Finger Contacts.", 52 pages.
U.S. Appl. No. 13/780,494, filed Feb. 28, 2013, titled: "Input Tools Having Viobro-Acoustically Distinct Regions and Computing Device for Use With the Same.", 34 pages.

(56) References Cited

OTHER PUBLICATIONS

Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et aL, "SilentSense: Silent User Identification via Dynamics of Touch and Movement Behavioral Biometrics," Cryptography and Security (cs CR); Human-Computer Interaction, pp. 9, Aug. 31, 2013.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC dated Feb. 26, 2018 for European Patent Application Number 14785422.8, 7 pages.
Communication pursuant to Article 94(3) EPC dated Mar. 5, 2018 for European Patent Application Number 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S. et al., ""SenGuard: Passive user identification on smartphones using multiple sensors,"" IEEE 7th International Conference on Wireless and Mobile Computing, Networking and Communications {WiMob}, pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Pedro, L et al., "Augmenting touch interaction through acoustic sensing", Proceedings of the ACM International Conference on Interactive Tabletops and Surfaces, pp. 53-56, Nov. 13-16, 2011.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages.(Including English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages.
Chinese Second Office Action received for Chinese Patent Application No. 201510240372.6 dated May 15, 2019, 16 pages.
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.
Communication pursuant 1 to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 pages.
Communication pursuant to Rules 70(2) and 70a(2) EPC received for European Patent Application No. 16818725.0 dated Jan. 8, 2019, 1 page.

(56) References Cited

OTHER PUBLICATIONS

First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.
European Search Report dated Apr. 8, 2019 for European Application No. 18195588.1, 7 pages.

\* cited by examiner

METHOD AND APPARATUS FOR CLASSIFYING TOUCH EVENTS ON A TOUCH SENSITIVE SURFACE

CROSS-REFERENCE TO RELATED APPLICATIONS

This application is a continuation of U.S. patent application Ser. No. 15/206,554, filed on Jul. 11, 2016, which is a continuation of U.S. patent application Ser. No. 14/242,127, filed on Apr. 1, 2014, which is a continuation of PCT/US2012/060865 filed on Oct. 18, 2012, and which claims the benefit of U.S. Provisional Patent Application No. 61/627,831, filed on Oct. 18, 2011, all of which are hereby incorporated by reference as if fully set forth herein.

This invention was made with Government support under IIS0713509 awarded by the National Science Foundation. The Government has certain rights in this invention.

TECHNICAL FIELD

The present invention relates to an enhancement to touch interaction; and more particularly, to an apparatus and method for classifying touch events on a touch sensitive surface.

BACKGROUND

Computers are increasingly featuring direct touch interfaces, found in forms as diverse as kiosks and interactive tabletops, to tablet computers and handheld mobile devices. At present, finger input on touch screens is handled very simplistically, often boiled down to an X/Y coordinate. Many technologies exist that have the ability to digitize different types of input. There are two main touch sensing approaches: active and passive. The key downside of active approaches is that an explicit object must be used (e.g., a special pen), which is implemented with electronics (and batteries if not tethered). For example, pens augmented with infrared light emitters on their tips can be used on the commercially available Microsoft Surface. There have also been efforts to move beyond pens, including, e.g., infrared-light-emitting brushes for painting applications. Current systems generally do not attempt to discriminate among different pens (just perhaps pen from finger input). Variably-modulated infrared light enables identification, but requires specialized hardware. Additionally, ultrasonics can be used for input localization, and can provide pen ID as well. Capacitive coupling in allows users or objects to be localized and identified, though this requires grounding plates or a physical connection to function.

Sensing based on electromagnetic resonance, another method, operates between active and passive. Although the tools and tangibles need not be powered, they contain a resonant coil that is excited by proximate EM fields, generated by the specialized tablet they operate on. Although highly capable, including the ability to provide ID, table-sized setups are prohibitively expensive at present. It is also possible to support object identification through a combination of RFID and vision processing, which offers greater scalability.

Fiducial markers are a truly passive approach. They provide the ID of an object through a uniquely patterned tag—often in a sticker form factor. This method has been shown to be very capable—the only major drawback is the size of the marker, which in general, prevents placement on small surfaces like the tip of a pen. Fiducial markers can also work in a capacitive-sensing manner, allowing tags to be embedded in an object. Additionally, the shape of an object can be captured optically and used for classification (e.g., mice and keyboards).

In general, the aforementioned techniques require instrumentation of the object providing input, which is problematic for fingers (i.e., people do not like to wear things on their fingers and hands). Researchers have also looked at wrist-mounted acoustic sensors that can classify finger-on-finger actions, such as pinching or flicking. Finger taps can also be localized on the body through acoustic fingerprinting. However, the latter systems require sensors to be placed on the user.

Without instrumentation, some areas of the finger can be determined through computer vision (e.g., pad vs. tip). Using accelerometers, soft and hard taps can be discriminated. Finally, time of flight analysis can be used to localize touch events on the surface of an object.

Contemporary interactive surfaces generally treat finger touches as a single class of input (a partial exception to this are finger-print scanning systems, which can capture a high-resolution fingerprint image to infer the 3D "posture" of a finger; also, area of contact via optical or capacitive sensing can be considered an extra input dimension). However, this is a gross simplification—fingers are diverse appendages, both in their motor capabilities and their anatomical composition. Supporting additional dimensions of finger input has largely been ignored because instrumenting the user with active or passive components is invasive.

SUMMARY

At present, in order for a finger to perform different operations at a single point in space, it must be overloaded, typically triggered by a tap-and-hold period or chording of the fingers (e.g., two-finger-tap for right click). This can trigger a transient contextual menu, which allows a user to select one of several actions. An alternative to finger overloading is breaking functionality out into one or more buttons. For example, there is a scheme in which a button is for minimizing a window and another for closing it. However, this is problematic for mobile devices with limited screen real estate.

In view of the above, the present invention provides an apparatus and method for classifying touch events on a touch sensitive surface.

In accordance with an aspect of the present invention, there is provided an apparatus for classifying touch events, which includes: a touch sensitive surface configured to generate a touch event when an object touches the touch sensitive surface, wherein the touch event entails a mechanical vibration upon contact with the surface; a touch event detector configured to detect the onset of a touch; and a touch event classifier configured to classify the touch event to identify the object used for the touch event.

In one exemplary embodiment, the touch event classifier includes: a conversion unit configured to convert a mechanical vibration signal into an electrical signal; an extraction unit configured to derive a series of features representative of the touch event from the electrical signal; and a classification unit configured to classify the touch input using the features to identify the object used for the touch event.

In one exemplary embodiment, the touch event detector is embedded in the apparatus to detect the touch event.

In one exemplary embodiment, the touch event detector is attached to the touch sensitive surface to detect the touch event.

In one exemplary embodiment, the mechanical vibration comprises an acoustic signal.

In one exemplary embodiment, the mechanical vibration is created via any one of finger parts including a fingertip, finger pad, a fingernail, and a knuckle or the mechanical vibration is created through the use of a passive tool impacting the touch sensitive surface.

In one exemplary embodiment, each of the finger parts is used to provide input to a touch based interface, and each of the finger parts can be bound to different user interface actions.

In accordance with another aspect of the present invention, there is provided a method for classifying touch events, which includes: detecting a touch event, wherein the touch event is made by an object touching/striking a touch sensitive surface and entails the generation of an acoustic signal due to impacting the touch sensitive surface; deriving a set of features representative of the touch event from the acoustic signal; and classifying the touch event using the features to identify the object used for the touch event.

In one exemplary embodiment, the detecting the touch event includes capturing a mechanical vibration signal.

In one exemplary embodiment, the classifying the touch event includes: converting the mechanical vibration signal into an electrical signal; extracting a series of features representative of the touch event from the electrical signal; and classifying the touch event using the features to identify the object used for the touch event.

In one exemplary embodiment, the mechanical vibration is created by any one of many parts of a finger, including a tip, a pad, a fingernail, and a knuckle or the mechanical vibration is created through the use of a passive tool impacting on the touch sensitive surface.

In one exemplary embodiment, each of the finger parts is used to provide a touch based interface, and each of the finger parts is used to input a secondary action.

BRIEF DESCRIPTION OF THE DRAWINGS

The above and other objects and features of the present invention will become apparent from the following description of embodiments given in conjunction with the accompanying drawings, in which.

DETAILED DESCRIPTION

Figure 1:
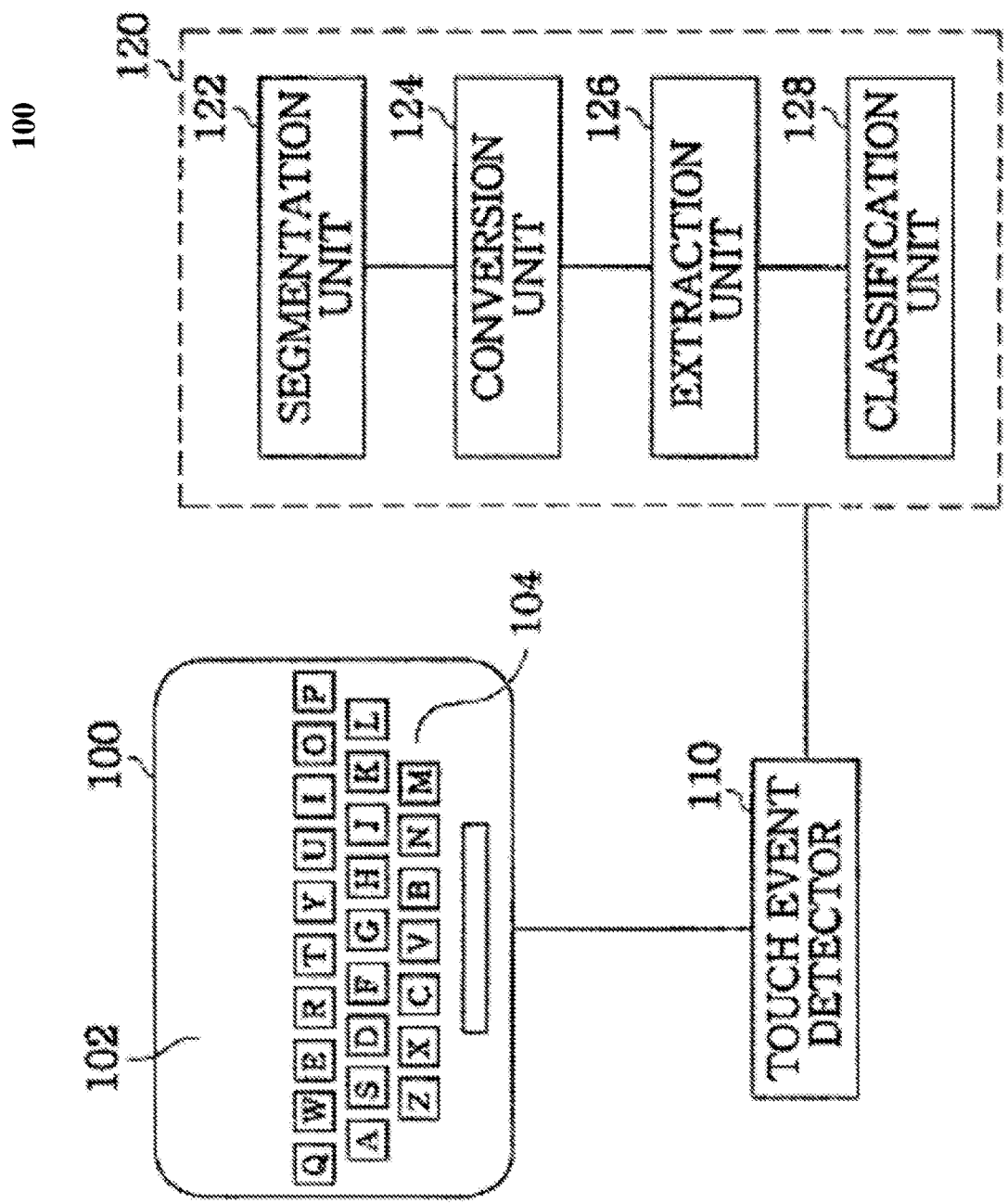
FIG. 1 is a block diagram of an apparatus for classifying touch events on a touch sensitive surface in accordance with a first embodiment of the present invention.

Hereinafter, embodiments of the present invention will be described in detail with reference to the accompanying drawings, in which like reference numerals and like components refer to like elements.

FIG. 1 illustrates a block diagram of an apparatus for classifying touch events on a touch sensitive surface in accordance with a first embodiment of the present invention.

The apparatus of the first embodiment includes a touch sensitive surface 100, a touch event detector 110, and a touch event classifier 120.

Figure 2:
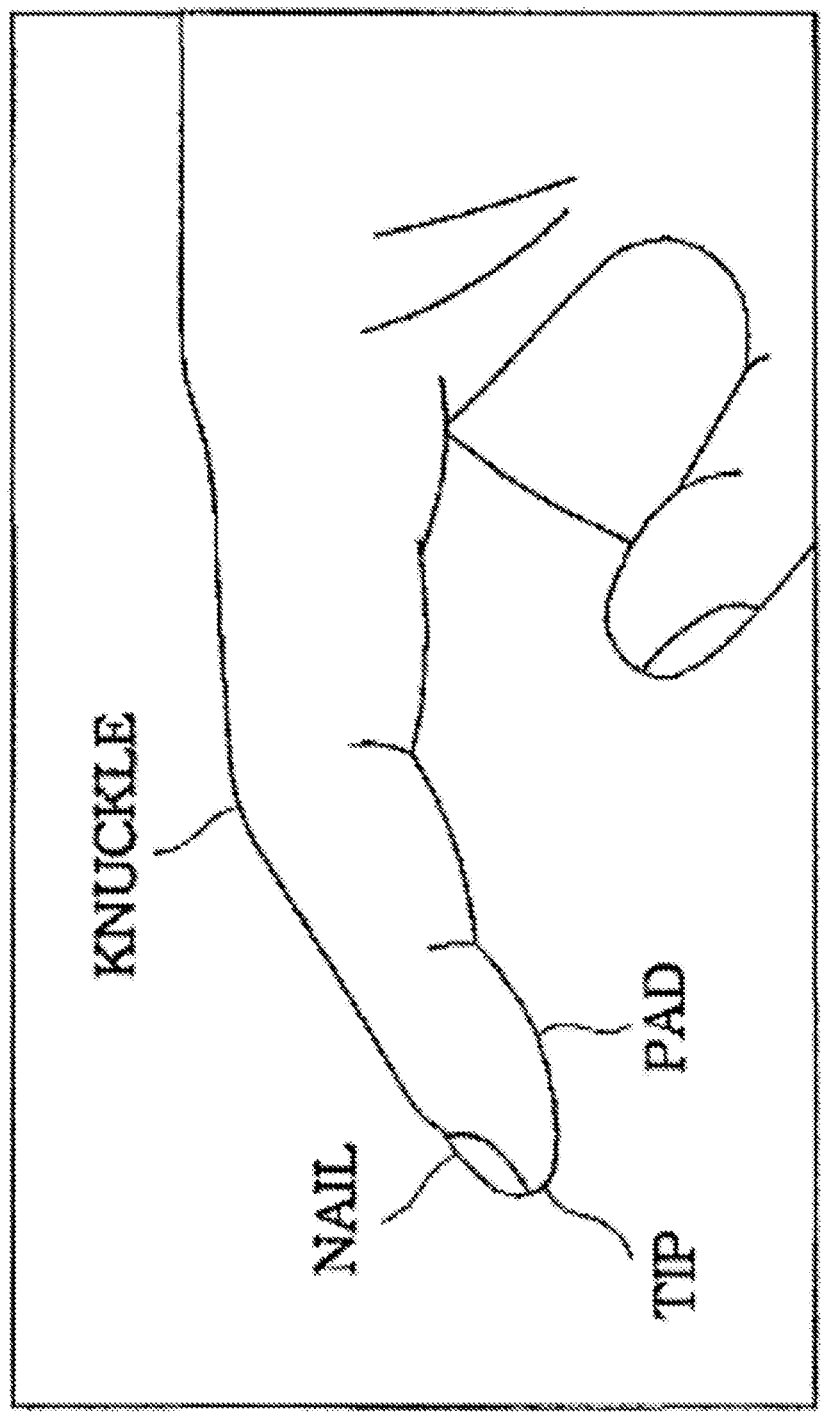
FIG. 2 illustrates different parts of a finger for producing different touch events in accordance with the embodiment of the present invention.
Figure 4:
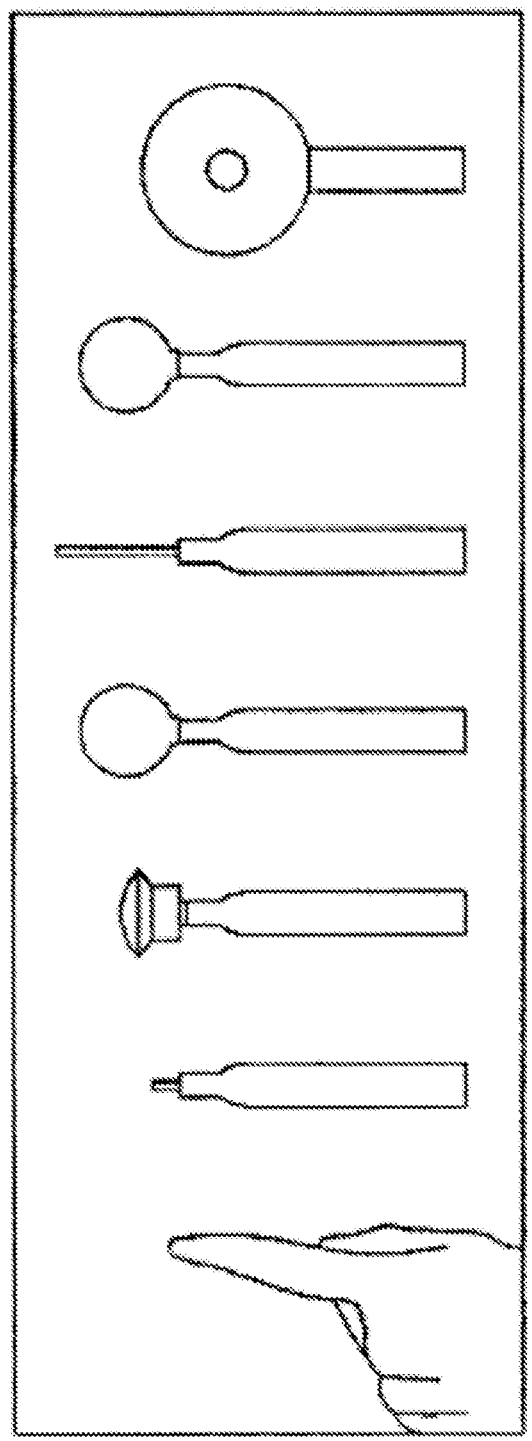
FIG. 4 shows a finger and six passive tools (i.e., objects requiring no power) with different materials affixed to their tips, such as from left to right, a polycarbonate nub, wood knob, acrylic ball, metal screw, ping-pong ball, and foam.

The touch sensitive surface 100 is an electronic visual display that can detect and track the presence and location of a touch event performed thereon, with a finger or other passive objects, such as a stylus. The touch sensitive surface 100 includes an interactive user interface 102 on which a variety of touch events are generated by a user. The touch events may include a touch event using a finger touch, touch events using different parts of a finger as illustrated in FIG. 2, and touch events using passive tools as illustrated in FIG. 4. A variety of technologies may be used, including optical, resistive, and capacitive touch screens to detect and track the presence and location of the touch event. For example, the touch sensitive surface 100 may be employed in a portable device such as a mobile phone, PDA, smart-phone and the like, but not limited thereto.

The touch sensitive surface 100 may provide a user interface, for example, a virtual soft keyboard 104 thereon. The virtual keyboard 104 has an alphabet character set on keys or buttons used to type text. To type a primary character, users may use their finger pad as usual. Such a soft keyboard on portable devices is particularly problematic—there are many keys that need to be provided on little space. In response, keyboards may be typically broken up into several "pages" of keys, toggled with modal buttons. Not only does this add extra clicks to typing interactions, but also further crowds the small screen.

The apparatus of this embodiment is aimed to alleviate some of these problems by employing touch events via objects inclusive of the finger parts or passive tools. It may feature two key sets that operate in parallel.

Fingers are diverse appendages, both in their motor capabilities and their anatomical compositions. A single digit contains different parts such as one or more knuckles, a tip, pad, and fingernail, as illustrated in FIG. 2. These finger parts may be employed to generate the touch events. Further, as shown in FIG. 4, a set of passive objects requiring no power may also be employed to generate the touch events. The passive objects may include six tools with different materials affixed to their tips, such as, from left to right, a polycarbonate nub, wood knob, acrylic ball, metal screw, ping-pong ball, and foam. These passive objects are simply different materials glued to the heads of dry erase markers.

Figure 3:
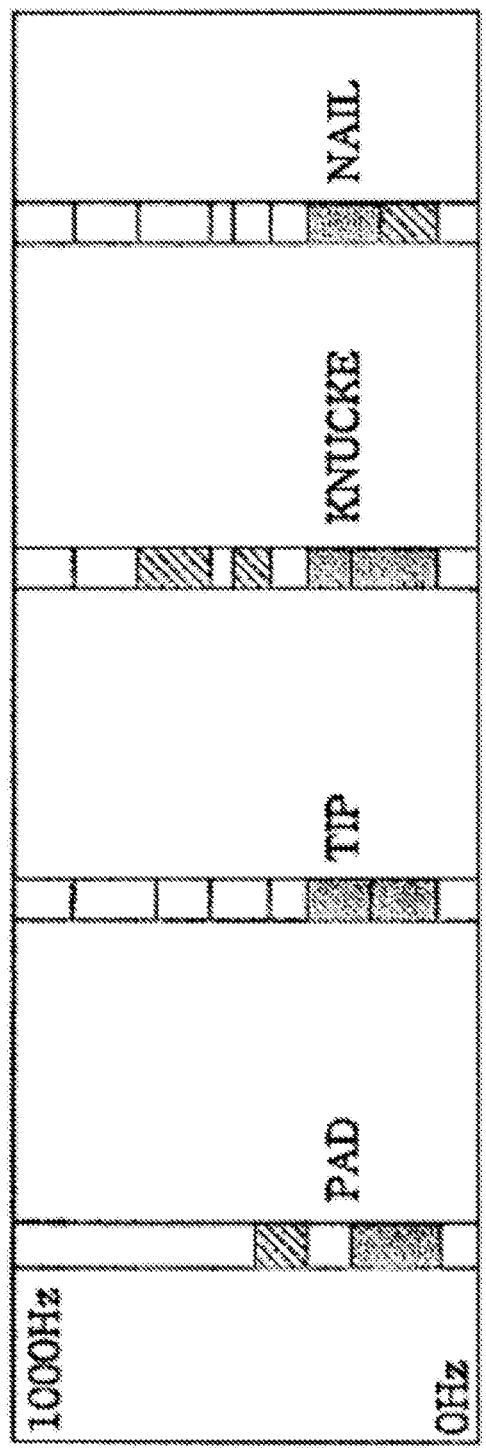
FIG. 3 shows spectrograms of four finger input types in accordance with the embodiment of the present invention.

When an object strikes a surface, an ensemble of mechanical vibrations propagate outward through the material. Typically, interactive surfaces use rigid materials, such as plastic or glass, which both quickly distribute and faithfully preserve the signal. As such, physical impact events using respective finger parts or respective passive tools cause mechanical vibrations upon contact with the touch sensitive surface 100. The mechanical vibrations entail different features for each finger part or passive tool. For example, FIG. 3 shows spectrograms of four types of the touch input. As known from FIG. 3, different parts of the finger produce different mechanical vibration (i.e., acoustic) signatures.

In accordance with one exemplary embodiment, the apparatus is designed to recognize small set of passive tools as well as discriminate different parts of the finger based on the different features. This ability to identify what object was used for the touch event is achieved by the feature classification. It relies on the physical principle that different materials produce different features and have different resonant frequencies as illustrated in FIG. 3.

In one exemplary embodiment, when a touch event of a finger is used as normal to provide a conventional touch based interface, touch events by the objects may be used to represent secondary actions to change the function or touch event of the other pressed key by the finger. For example, an "ALT" input may be achieved by a physical impact event on the touch sensitive surface 100 using a knuckle of the finger (which may correspond to "right click" on a desktop computing system), a "BACKSPACE" input may be achieved by a physical impacting event on the touch sensitive surface 100 using a fingernail, and the like. The strength of impacts does not need to be great. Indeed, a user needs to tap no harder than required to type on a keyboard. A key property of this approach is that items striking the touch sensitive surface 100 do not require active components. Input objects are simply composed of different materials and are entirely passive. Thus, users have access to the entire character set without having to switch pages.

Referring again FIG. 1, the touch event detector 110 is disposed to detect the mechanical vibration caused by the touch event using a finger part as illustrated in FIG. 2 or a passive tool as illustrated in FIG. 5.

The touch event detector 110 can be triggered by the touch sensitive surface 100 or by the onset of appropriate mechanical vibrations resulting from an object touching the screen. To capture events and the subsequent mechanical vibrations, the touch event detector 110 may include one or more impact sensors, vibration sensors, accelerometers, strain gauges, or acoustic sensors such as a condenser microphone, a piezoelectric microphone, MEMS microphone or the like.

Once a mechanical vibration signal by the touch event has been captured by the touch event detector 110, the touch event classifier 120 processes the mechanical vibration signal to classify the touch event so that an object used for the touch event can be identified.

The touch event classifier 120 includes a segmentation unit 122 configured to segment the mechanical vibration signal in a digital representation; a conversion unit 124 configured to convert the digitized vibration signal into an electrical signal; a feature extraction unit 126 configured to derive a series of features from the electrical signal; and a classification unit 128 configured to classify the touch event using the features to identify what part of the finger or passive tool was used for the touch input.

The segmentation unit 122 samples the mechanical vibration signal, for example, at a sampling rate 96 kHz, using a sliding window of 4096, which contains a 43 ms segment of the mechanical vibration signal.

The conversion unit 124 then performs, for example, a Fourier Transform on sampled time-dependent vibration signal to produce an electrical signal having frequency domain representation. For example, the Fourier Transform of this window may produce 2048 bands of frequency power. Among them, the lower 500 bands, representing acoustic (i.e., mechanical vibration) power from 0 to 10 kHz, may be selected for further processing thereof. Alternatively, other frequency bands, for example, lower than 1 kHz may be chosen, which is expressive as shown in FIG. 3.

The touch event classifier 120 may further down-sample this data into an additional vectors (i.e., buckets of ten), providing a different aliasing. In addition, additional features may be calculated from the mechanical vibration signal such as the average absolute amplitude, total absolute amplitude, standard deviation of the absolute amplitude, and center of mass for both the segmented input signal and the Fourier Transformed signal.

The feature extraction unit 126 may also calculate a series of features from the frequency domain representation of the mechanical vibration, such as the fundamental frequency of the impact waveform.

The classification unit 128 classifies the touch event using the features to identify what object was used to generate the touch event.

To aid classification, the user can provide supplemental training samples to the classifier.

In one exemplary embodiment, the classification unit 128 may be implemented with a support vector machine (SVM) for feature classification. The SVM is a supervised learning model with associated learning algorithms that analyze data and recognize patterns, used for classification and regression analysis.

Once a classification has been made, the resulting type is used to label an unassigned input point, which is digitized by one of many touch sensing technologies. This matching process may be done several ways. In one exemplary embodiment, this can be done by selecting an input event with the closest onset timestamp. The entire classification process, starting from the onset of impact, can occur in 100 ms or less, allowing for real-time interaction.

In practice, this method appears to work fairly well and enables several users with multiple input objects to work on a common surface simultaneously. However, there is one special case where this process breaks down and for which there is no immediate solution-timing collisions. In particular, if two objects strike the touch sensitive surface in sufficiently close temporal proximity, their vibration signals will not be segmented separately, and therefore not allow for accurate classification. The duration of this period is defined by four factors: 1) the aggressiveness of the segmenter (classification could potentially use, e.g., the first 10 ms of the mechanical vibration signal), 2) the resonant frequencies of the impact material (lower frequencies take longer to dissipate), 3) the dampening of the touch sensitive surface (to dissipate previous impacts), and 4) the size of the touch sensitive surface (more mass takes longer to dampen).

An alternative solution is to employ sophisticated algorithms (e.g., beam forming) that can localize impact sounds and separate them into distinct acoustic waveforms. Although this is generally applied to environmental noises, such as speech, the principles may also be applied to touch surfaces. However, this issue is mostly unnecessary for mobile devices, which, due to their small size and light weight, quickly diminish acoustic energy. Taps can occur as close as .about.50 ms apart on the apparatus of the embodiment. Furthermore, mobile devices typically have a single user. This reduces the possibility of simultaneous impacts.

The embodiment of the present invention has been shown and described to an enhancement to touch interaction that allows the touch sensitive surfaces to identify the type of object being used for touch input. The embodiment may also be used in a wide variety of application domains and use contexts such as a simple painting interface as follows.

For example, to draw freehand, a user may simply use a finger pad like a brush. To draw line segments, a finger tip taps the touch sensitive surface and then drags to a desired location. To undo the last stroke, users can nail tap anywhere on the interactive touch screen. This, like the keyboard demo of the first embodiment, illustrates a simple way to remove modal buttons from the interaction and push this complexity to highly dexterous fingers. Other interactions may involve rapid switching between tools (e.g., fill tool, erase tool) and modes (e.g., brush thickness, opacity, color).

It is interesting to note that humans use different parts of their fingers in different ways—to scratch an itch, type on a keyboard, tap a co-worker on the shoulder, or knock on a door. With careful design, it may be possible to leverage these norms such that existing finger behaviors could be ported to and made relevant in digital domains.

For example, consider a system where a knuckle "knock" is used to open files or applications. A tap with the tip of the finger (i.e., poke) could be used to bring something to attention, perhaps maximized or given focus, whereas a fingernail "flick" could be used to minimize or delete an item. This functionality could operate in harmony with conventional finger-driven interfaces, which tend to rely on finger pads for pointing and "clicking".

Humans have remarkable dexterity with handheld tools and numerous research projects have introduced physical manipulators to interactive systems. These often come in the form of pens, pointing devices, stamps (e.g., for instantiation) and miscellaneous tools (e.g., dials, sliders, guides).

Such items could easily incorporate acoustically-distinct materials, and be made small and pointy, like real pens and pencils. These would be extremely durable and inexpensive to mass produce.

Figure 5A:
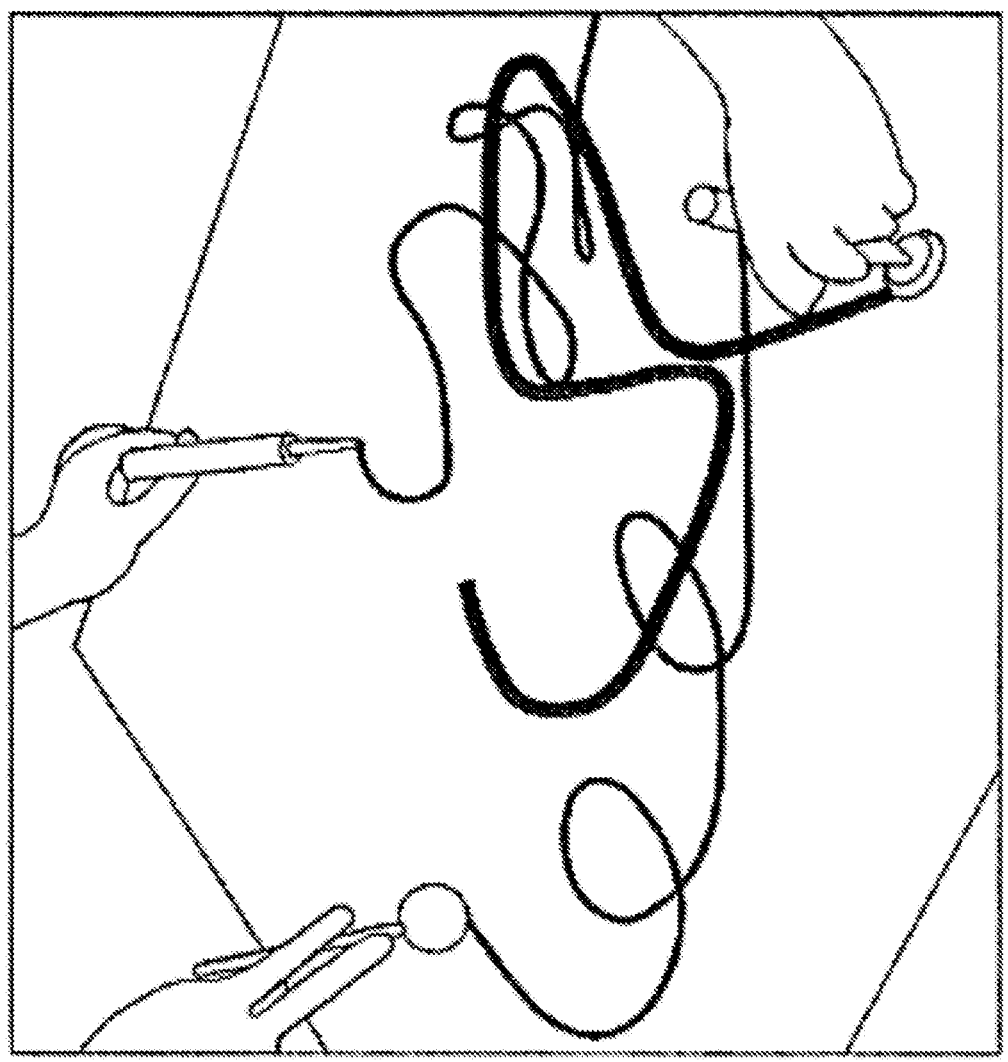
FIG. 5A shows passive tools (i.e., objects requiring no power) representing different "brush" colors, allowing several users to paint simultaneously, without color or mode switching.

Furthermore, for example, painting applications on conventional interactive surfaces typically use a palette-based color mode selection. When a color is chosen, all users are forced to switch to this color. However, as shown in FIG. 5A, the apparatus of the second embodiment allows multiple users to pick up one of several color "brushes" with the six tools shown in FIG. 4 and use them simultaneously. Further, a tool with different materials on each end may be used to draw and then flipped around to erase, like a pencil.

Figure 5B:
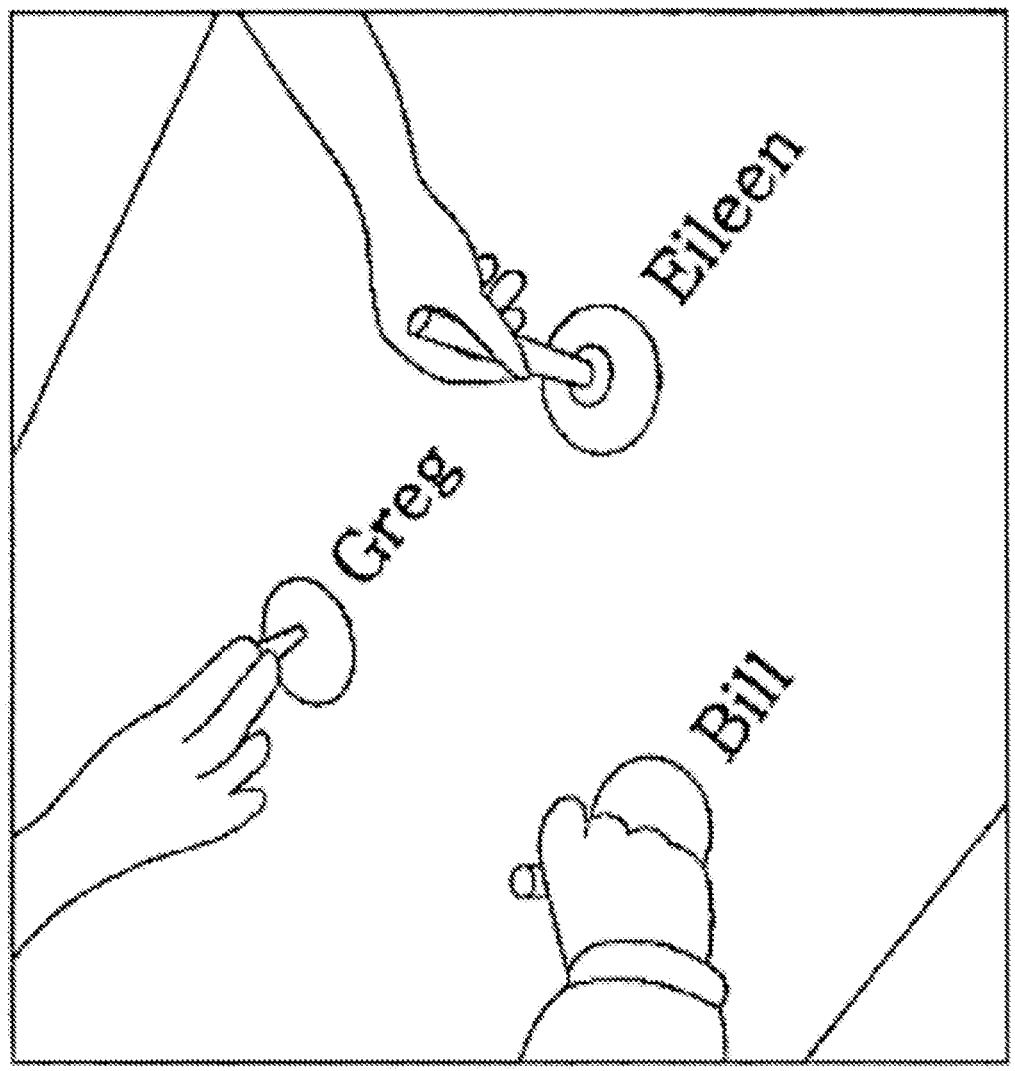
FIG. 5B shows passive pens (i.e., solid materials requiring no power) allowing a touch sensitive surface to identify which user was performing what action.

Another possibility is to assign users uniquely identified input tools. This would allow actions on a system to be attributed to a particular person, e.g., Greg, Bill, or Eileen, as shown in FIG. 5B. This embodiment may also be used for, e.g., collaborative document editing, individualized undo stacks, and read/write permissions.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A method for classifying touch events, the method comprising:
    sampling at least one mechanical vibration signal associated with a touch event on a surface to create a digital representation of the at least one mechanical vibration signal;
    converting the digital representation into an electrical signal having a frequency domain representation;
    deriving a first set of features representative of the touch event based on at least a portion of the electrical signal;
    down sampling the at least the portion of the electrical signal to create a down sampled signal;
    deriving a second set of features representative of the touch event based on at least a portion of the down sampled signal; and
    classifying, with a processor, the touch event using at least one of at least a portion of the first set of features or at least a portion of the second set of features to identify an object associated with the touch event.

2. The method of claim 1, wherein at least one of the deriving the first set of features representative of the touch event or the deriving the second set of features representative of the touch event comprises deriving at least one of an average absolute amplitude associated with the at least one mechanical vibration signal, a total absolute amplitude associated with the at least one mechanical vibration signal, a standard deviation of absolute amplitude associated with the at least one mechanical vibration signal, a center of mass of associated with the at least one mechanical vibration signal, a predetermined spectrogram associated with the at least one mechanical vibration signal, a power associated with at least one specific frequency component of the at least one mechanical vibration signal, a predetermined frequency spectrum content of the at least one mechanical vibration signal, or a frequency spectrum of a combination of the at least one mechanical vibration signal with at least another mechanical vibration signal.

3. The method of claim 1, wherein the sampling the at least one mechanical vibration signal associated with the touch event comprises sampling the at least one mechanical vibration signal associated with the touch event that is associated with at least one of a passive tool or a part of a user's body impacting the surface.

4. The method of claim 1, wherein the classifying the touch event comprises classifying the touch event using the at least the portion of the first set of features and the at least the portion of the second set of features to identify the object associated with the touch event.

5. The method of claim 1, wherein the sampling the at least one mechanical vibration signal associated with the touch event comprises sampling the at least one mechanical vibration signal associated with the touch event that is created via at least one finger part including at least one of a tip, a pad, a fingernail, or a knuckle on the surface.

6. The method of claim 5, further comprising:
    providing a touch based interface based at least in part on the at least one mechanical vibration signal created via the at least one finger part being identified as the object associated with the touch event.

* * * * *